Patented May 9, 1950

2,507,422

UNITED STATES PATENT OFFICE 2,507,422

OXIDATIVE POLYMERIZATION OF SILICIC ACID ESTERS

John B. Rust, Montclair, and Charles A. MacKenzie, Upper Montclair, N. J., assignors, by direct and mesne assignments, of one-half to Montclair Research Corporation, a corporation of New Jersey and one-half to Ellis-Foster Company, a corporation of New Jersey No Drawing. Application May 29, 1945, Serial No. 596,595

18 Claims. (Cl. 260—2)

This invention relates to silicon esters, to methods of controlled polymerization thereof, to the polymerization products resulting from such methods, and to the utilization of such polymerization products.

Heretofore silicic acid esters such as ethyl silicate, have enjoyed a relatively widespread use as impregnating agents, varnishes and the like. These materials are generally partially polymerized by a controlled hydrolysis. Thus there have been several methods described for hydrolyzing these esters but all of them require the presence of water to split off the ester group and allow for a partial polymerization of the silicic acid. In many cases this reaction is not easily controllable and results in the deposition of silicon oxide or highly polymeric silicic acid.

Among the objects of the present invention is included methods of polymerizing esters of silicic acid under conditions which are subject to easy control, to produce viscous or partially polymerized materials available for a variety of uses.

Further objects include the products resulting from such methods of treatment.

Still further objects include the provision of lacquers and varnishes made from silicic acid esters and from esters of polymerized silicic acid.

Still further objects and advantages of the present invention will become apparent from the more detailed descriptions set forth below, it being understood, however, that such more detailed description is given by way of illustration and explanation only, and not by way of limitation, since various changes therein may be made by those skilled in the art without departing from the scope and spirit of the present invention.

In accordance with the present invention it has been found that a controlled polymerization of the esters of silicic acid in general, may be obtained by the controlled oxidation of the esters, that is, by subjecting the esters to the action of oxygen at elevated temperatures. Essentially the process involves subjecting the silicic acid esters to oxidation by air, as for example, by passing air particularly dry air, through the heated material. In this way it has been found that the organic group is oxidized off with the production of aldehydes, acids, and so forth, and simultaneously there is produced partially polymerized silicic acid ester. The organic groups which are removed or converted into aldehydes, acids, etc. in this treatment, and which distill out of the reaction mixture with the effluent gases, may be recovered therefrom in appropriate cases. The process can be carried out under strictly controlled conditions depending upon the rate at which the air is introduced and the efficiency of mixing of the silicon derivatives with the air bubbles or oxygen to enable control of the extent to which the reaction is carried. So that the extent to which the reaction is carried can be controlled by the degree of oxidation which is carried out in the removal of the organic groups.

The temperature at which the reaction is carried out should be sufficient to yield a satisfactory speed of reaction and for this purpose elevated temperatures are preferred, as for example, temperatures above 100° C. up to the boiling point of the ester undergoing treatment and even higher temperatures if pressure is employed. A preferred range of temperatures covers the range of about 100 to 200° C. The reactions may be carried out in stages in which successively different temperatures are employed, as for example, higher temperatures in a first stage of reaction followed by lower temperatures in a second stage, or vice versa.

As the raw materials to be treated in accordance with the present invention, generally there may be employed the esters of silicic acid, more particularly the esters of ortho silicic acid, which esters may contain the same or different organic groups constituting the esterifying groups, in the same molecule, or mixtures of different esters may be employed. It is not necessary to use pure esters per se in carrying out the invention, but the reaction mixtures produced in the formation of such esters may be employed without separating the individual esters from such reaction mixtures. The esters most desirably employed in accordance with the present invention will be the tetra esters of ortho silicic acid having the general formula

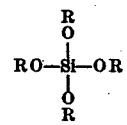

But esters of other silicic acids may be employed, as for example, the esters of di-silicic acid having the formula

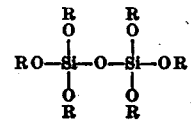

or the esters of polysilicic acids, as for example those corresponding to the formula

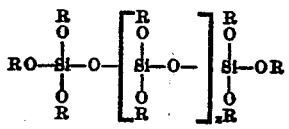

In the above formulations the organic group R may be alkyl, aryl, olefinyl, alkenyl, alkynyl, arenyl, arynyl, alicyclic cycloaromatic aralkyl, illustrated by methyl, ethyl, propyl, butyl, amyl, hexyl, heptyl, octyl, vinyl, allyl, butenyl, the radicals from acetylene, methyl acetylene, propyl acetylene, cyclohexyl, benzyl, phenyl, tolyl, xenyl, chlorphenyl, styryl, and radicals from such derivatives as phenylacetylene. Specifically there may be employed ethylorthosilicate, propyl orthosilicate, butyl orthosilicate, amyl orthosilicate, and the like, or mixed esters of silicic acid, such as methyl butyl orthosilicate, ethyl propyl orthosilicate, benzyl ethyl orthosilicate, and the like. The invention will be particularly illustrated by examples dealing with the oxidation of ethyl orthosilicate but this is exemplary of the treatment of other stated esters as set forth above.

The reaction is preferably carried out by blowing air through the silicic acid ester undergoing treatment while the latter is in liquid condition. Esters which are liquid at the temperature at which the treatment is carried out may thus be directly treated. If desired, solvents may be present which preferably are solvents that are inert to the oxygen treatment to which the ester is being subjected. Such solvents may be solvents which are desirably used for solutions of the polymerized or partially polymerized silicic acid esters thus making them available for use as lacquers or varnishes or solvents may subsequently be added to the polymerized material to produce varnishes or lacquers and so forth, or the undissolved partial polymer may be used directly as a varnish impregnant, etc. By the procedures set forth it has been found possible to prepare pale colored, partially polymerized silicic acid esters of a wide range of viscosity. In their utilization they may after the oxidation treatment, be heated and converted into tough resinous materials or brittle films depending upon the substituent groups present, as by heating or baking films or coatings of such materials.

As the oxidizing agent, dry air is preferable, but pure oxygen or oxygen mixed with various inert gases, or ozone, and even other oxidizing agents such as benzoyl peroxide, acetyl peroxide, and the like may be employed. The oxidation may be carried out solely by bubbling air through the heated silicic acid ester, or catalysts may be present, such catalysts for example as vanadium pentoxide, tin vanadate, and the like. No catalysts are, however, essential in carrying out the reaction as is shown in the examples set forth below.

The products resulting from the oxidation treatment may be subjected to further heat treatment, as for example, in the absence of air, or they may be baked, particularly when used in the form of lacquers, films, or molded products. The type of treatment or the extent of heating, etc., may depend on the utilization that is being made and also how far the oxidation treatment has been carried. The oxidation treatment may as indicated above, be carried out until the organic groups present are substantially removed or reduced or until polymeric materials are obtained. The resulting products are different from those prepared by other methods in view of the combinations which result from bonding of the substituents while the organic groups are being removed in the oxidation process.

The following examples serve to illustrate the invention.

*Example 1.*—Ethyl silicate $(C_2H_5)_4SiO_4$ was heated in a reactor to 160° C. Air which had been previously dried thoroughly over calcium chloride and over concentrated sulfuric acid, was passed through the heated ethyl silicate for a period of 4 hours. In this time the ethyl silicate gradually became thicker. It subsequently and finally set up to a clear, glass-like gel. During the period of oxidation it was noted that the effluent gases had a strong burned odor of acetaldehyde and acetic acid.

*Example 2.*—A second oxidation was run similar to the first except that the ethyl silicate was heated to the boiling point under a water cooled reflux condenser. Thoroughly dried air was passed through the heated ethyl silicate for about 4 hours. The material again thickened gradually at this time and finally set up to a rubbery gel. A sample was abstracted before the material had set to a gel and a film of this was baked in an oven on a glass plate at 120° C. In a short time a non-tacky, resilient film had been obtained.

*Example 3.*—Butyl orthosilicate prepared by the reaction of n-butanol on silicon tetrachloride was heated in a reactor for 6 hours at 160–170° C. During this period air dried by passage through calcium chloride and concentrated sulfuric acid was bubbled through the heated butyl silicate. At the end of this time a viscous, orange material was obtained which, on standing at room temperature for 8 hours, turned into an orange, rubbery solid possessing elastic properties. Subsequent heating of this material at 120° C. for 8 hours caused no change in its rubbery nature.

*Example 4.*—Tetra phenyl silicate $(C_6H_5)_4SiO_4$ was heated at 170–180° C. for 8 hours in a test tube through which dry air was passed. A pale colored syrup was secured which was dissolved in xylol to form a clear solution containing 75% solids. A film baked at 120° C. for 8 hours was hard, non-tacky, but could be marked with the fingernail.

*Example 5.*—Tetra ethyl silicate containing 0.10% vanadium pentoxide suspended therein was heated for 2 hours at 150–160° C. while air previously dried by passage through calcium chloride and concentrated sulfuric acid, was slowly bubbled through. The liquid became very viscous. Continued aeration for ½ hour more at this temperature gave an insoluble, glass-like gel.

*Example 6.*—Tetra ethyl silicate was heated for 3 hours at 150–160° C. in the presence of air previously dried by passage through calcium chloride, concentrated sulfuric acid, and finally through an ozonizer. A viscous syrup was secured which was dissolved in xylol and amyl acetate to secure a solution containing 60% solids. A film baked for 1 hour at 150° C. cracked and peeled from the glass. The pieces of film were very hard and could be readily powdered.

While the esters of orthosilicic acid have been illustrated above, esters of other silicic acids may be employed, for example, the esters of orthosilicoformic acid having the general formula

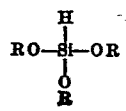

where R may be any of the organic substituent groups as set forth above. Such organic groups may carry substituents such as the halogens, etc. The esters of orthosilicoformic acid may be prepared in any desired way, as for example, by the action of an alkylene oxide on silicochloroform. To illustrate such esters the following example is given.

*Example 7.*—Gaseous ethylene oxide was bubbled through 135 parts of well agitated trichloro silane and cooled in an ice bath until the exothermic reaction had ceased and the reaction mixture had increased 140 parts in weight. The resulting product tris beta chloroethoxy silane boiled at 154–158° C. at 18 mm. The product was a clear, colorless liquid with a faint odor.

The tris beta chloroethoxy silane (chlorethyl silico formate)

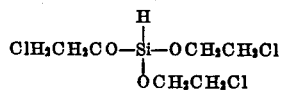

was heated for 4 hours at 170–180° C. and for 6 hours at 180–200° C. while dry air was passed through, to secure a relatively viscous syrup. A film baked at 150° C. for 5 hours was clear, dust free; but tacky.

Materials of the present invention may be used in lacquers, or adhesives, either alone, or in mixture with other completely reacted or potentially reactive compounds. Such compounds may include resins such as rosin, copal, shellac and so forth, as well as synthetic resins including urea aldehyde resins, phenol aldehyde resins, melamine resins, aniline aldehyde resins, acetone formaldehyde resins, alkyd resins, cumarone resins, polymerized vinyl derivatives and vinyl resins, polymerized acrylic derivatives, including the esters of acrylic and methacrylic acids and so forth.

The silicon derivatives may be employed as textile finishing compositions to render the textiles hydrophobic. They may also be applied to ceramics or metals, especially those materials naturally containing a thin oxide coating. Conversion products of the present invention may be used on textiles to produce waterproofing, creaseproofing, wrinkleproofing, and the like, and to render rayons slip-proof.

The derivatives of the present invention may be used in lubricating oils, or as lubricating oils, or as additives to hydrocarbon oils such as lubricating oils and also for inclusion with vegetable oils, particularly the drying oils such as linseed oil and China-wood oil, and the semi-drying oils such as soya bean oil and so forth, as well as the non-drying oils including castor oil and so forth. These derivatives may be introduced into the oils by blending or cooking them with such oils.

Products of the present invention may be used in the production of heat transfer liquids since they possess in general excellent heat stability. In view of their excellent electrical properties, they may be utilized in the production of varnishes, coatings, or coated articles for electrical insulation, and the liquid materials may be used as dielectrical liquids, etc. They may be used in the production of laminated products for bonding together two or more sheets of the same or different organic or inorganic materials. They may be employed also as plasticizers and binders and their utilization for such purposes may be controlled by the number of alkyl or aryl or similar constituents introduced into the derivatives.

Products of the present invention may be utilized in compositions either with or without resins as set forth above and with or without solvents in the production of lacquers and coating compositions. They may similarly be used in the production of molded articles as in the production of hot pressed products, with or without fillers incorporated into the compositions either before or after removal of solvents and then subjecting the compositions to hot pressing operations.

Having thus set forth our invention, we claim:

1. The method of preparing organo silicon derivatives which comprises subjecting an ester of a silicic acid selected from the group consisting of the esters of orthosilicic acid and the ortho esters of silicoformic acid, the grouping forming the ester with the acid radical being monohydroxy to the action of substantially dry oxygen blown therethrough at a temperature of about 100 to 200° C. while maintaining the ester in the liquid state until a polymeric derivative retaining organic groups from the ester is obtained and discontinuing the reaction at that stage.

2. The method of preparing organo silicon derivatives which comprises subjecting an alkyl orthosilicate to the action of substantially dry oxygen blown therethrough at a temperature of about 100 to 200° C. while maintaining the ester in the liquid state until a polymeric derivative retaining organic groups from the ester is obtained and discontinuing the reaction at that stage.

3. The method of preparing organo silicon derivatives which comprises subjecting an aryl orthosilicate to the action of substantially dry oxygen blown therethrough at a temperature of about 100 to 200° C. while maintaining the ester in the liquid state until a polymeric derivative retaining organic groups from the ester is obtained and discontinuing the reaction at that stage.

4. The method of preparing organo silicon derivatives which comprises subjecting an ester of a silicic acid selected from the group consisting of the esters of orthosilicic acid and the ortho esters of silicoformic acid, the grouping forming the ester with the acid radical being monohydroxy to the action of substantially dry oxygen blown therethrough at a temperature of above about 100° C. while maintained in the liquid state until a polymeric derivative retaining organic groups from the ester is obtained and discontinuing the reaction at that stage.

5. The method of preparing organo silicon derivatives which comprises subjecting an alkyl orthosilicate to the action of substantially dry oxygen blown therethrough at a temperature of above about 100° C. while maintained in the liquid state until a polymeric derivative retaining organic groups from the ester is obtained and discontinuing the reaction at that stage.

6. The method of preparing organo silicon derivatives which comprises subjecting an aryl orthosilicate to the action of substantially dry oxygen blown therethrough at a temperature of above about 100° C. while maintained in the liquid state until a polymeric derivative retaining organic groups from the ester is obtained and discontinuing the reaction at that stage.

7. The method of preparing organo silicon derivatives which comprises subjecting an ester of a silicic acid selected from the group consisting of the esters of orthosilicic acid and the ortho esters of silicoformic acid, the grouping forming the ester with the acid radical being monohydroxy to the action of substantially dry oxygen blown therethrough at a temperature of above about 100° C. while maintained in the liquid state until a polymeric derivative retaining organic groups from the ester is obtained and discontinuing the reaction at that stage and baking the polymeric derivative.

8. The method of preparing organo silicon derivatives which comprises blowing substantially dry air through an ortho silicic acid ester the grouping forming the ester with the acid radical being monohydroxy, maintained in the liquid state at a temperature of from 100 to 200° C. until a polymeric derivative retaining organic groups from the ester is obtained and discontinuing the reaction at that stage.

9. The method of preparing organo silicon derivatives which comprises blowing substantially dry air through ethyl ortho silicate maintained in the liquid state at a temperature of about 150 to 160° C. until a polymeric derivative retaining organic groups from the ester is obtained and discontinuing the reaction at that stage.

10. The method of preparing organo silicon derivatives which comprises blowing substantially dry air through butyl ortho silicate maintained in the liquid state at a temperature of about 160 to 170° C. until a polymeric derivative retaining organic groups from the ester is obtained and discontinuing reaction at that stage.

11. The method of preparing organo silicon derivatives which comprises blowing substantially dry air through phenyl ortho silicate maintained in the liquid state at a temperature of about 170 to 180° C. until a polymeric derivative retaining organic groups from the ester is obtained and discontinuing reaction at that stage.

12. The method of preparing organosilicon derivatives which comprises blowing substantially dry air through an alkyl orthosilicic acid ester containing alkyl groups only maintained in the liquid state at a temperature of from 150 to 180° C. until a polymeric derivative retaining organic groups from the ester is obtained and discontinuing the reaction at that stage.

13. The method of preparing organosilicon derivatives which comprises blowing substantially dry air through an aryl orthosilicic acid ester containing aryl groups only maintained in the liquid state at a temperature of from 150 to 180° C. until a polymeric derivative retaining organic groups from the ester is obtained and discontinuing the reaction at that stage.

14. The method of claim 4 in which the ester is an alkyl silicoformate.

15. The method of claim 4 in which the ester is an aryl silicoformate.

16. The method of claim 4 in which the ester is ethyl orthosilicate.

17. The method of claim 4 in which the ester is n-butyl orthosilicate.

18. The method of claim 4 in which the ester is phenyl orthosilicate.

JOHN B. RUST.
CHARLES A. MacKENZIE.

REFERENCES CITED

The following references are of record in the file of this patent:

UNITED STATES PATENTS

| Number | Name | Date |
|---|---|---|
| 1,809,755 | King et al. | June 9, 1931 |
| 2,114,866 | Vaughn | Apr. 19, 1938 |
| 2,268,589 | Heany | Jan. 6, 1942 |
| 2,276,094 | Rothrock | Mar. 10, 1942 |
| 2,329,632 | Marsden | Sept. 14, 1943 |
| 2,394,642 | Strain | Feb. 2, 1946 |
| 2,396,692 | Garner | Mar. 19, 1946 |

FOREIGN PATENTS

| Number | Country | Date |
|---|---|---|
| 707,393 | Germany | June 20, 1941 |

OTHER REFERENCES

Cogan et al., Chemical and Eng. News, vol. 24, No. 18, September 25, 1946, pages 2499 and 2500.